Aug. 20, 1968  C. B. ASKE, JR  3,397,921
VEHICLE WHEEL TRIM
Filed Feb. 6, 1968  5 Sheets-Sheet 1
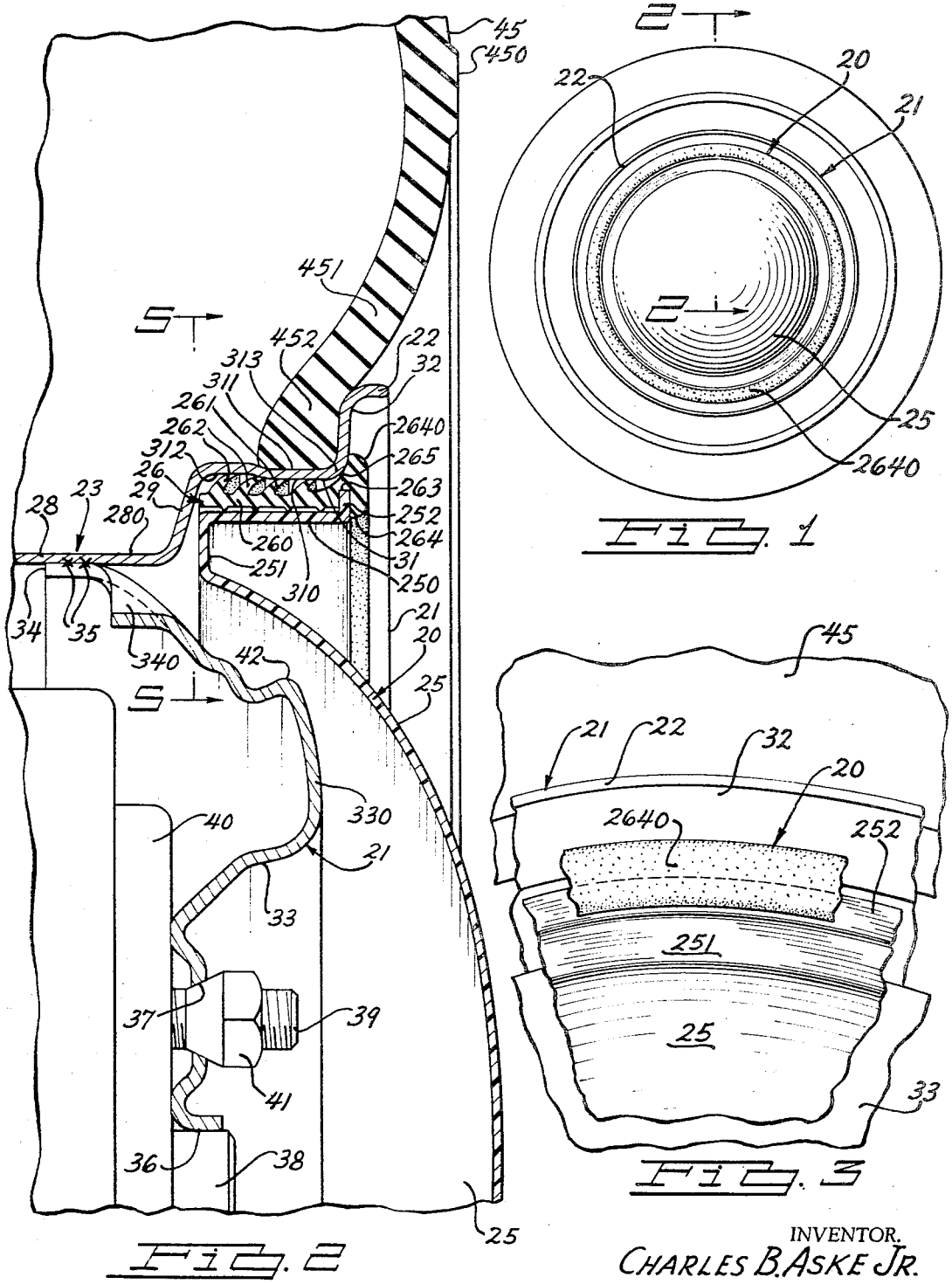
INVENTOR.
CHARLES B. ASKE JR.
BY
Everett G. Wright
ATTORNEY

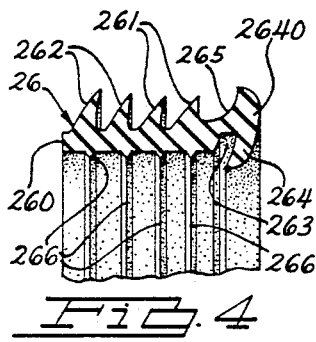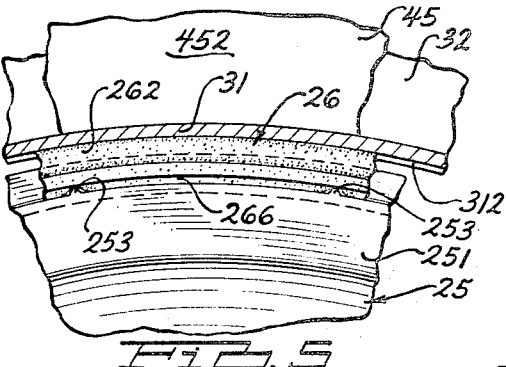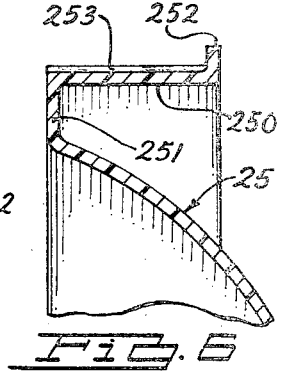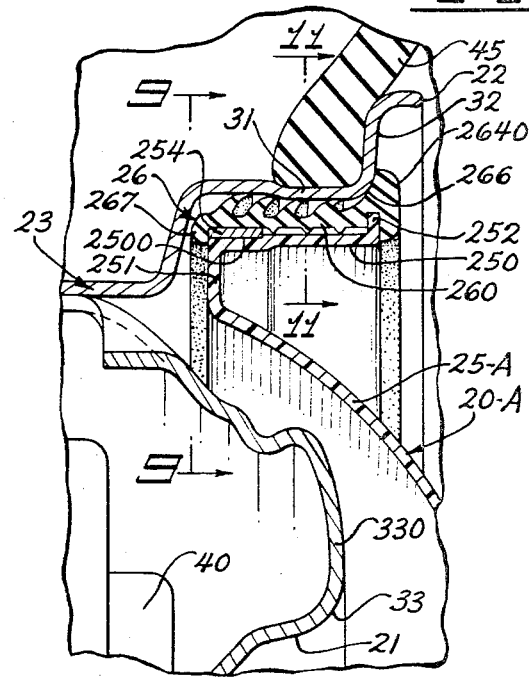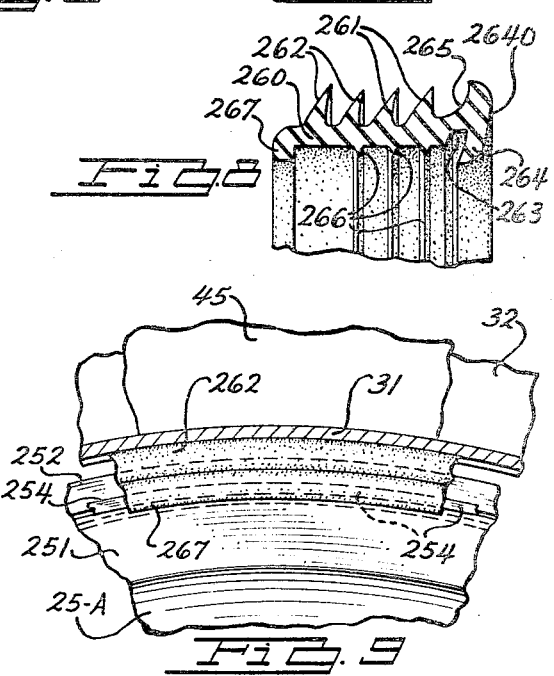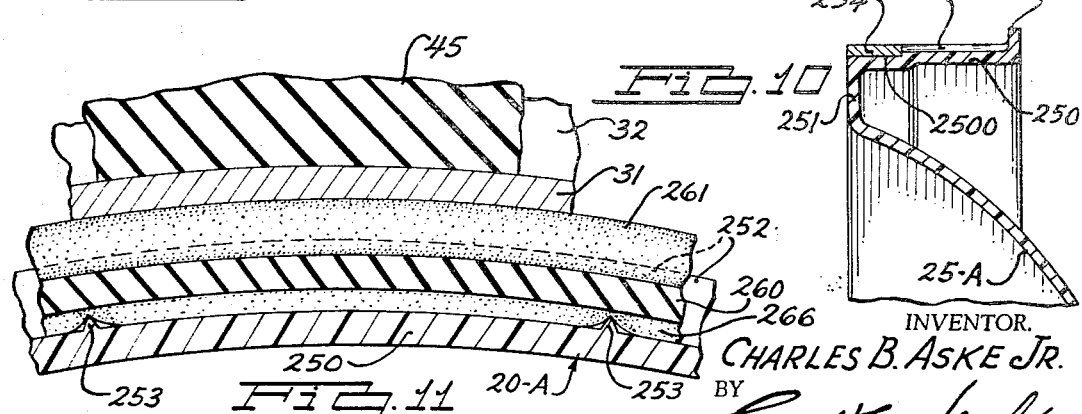

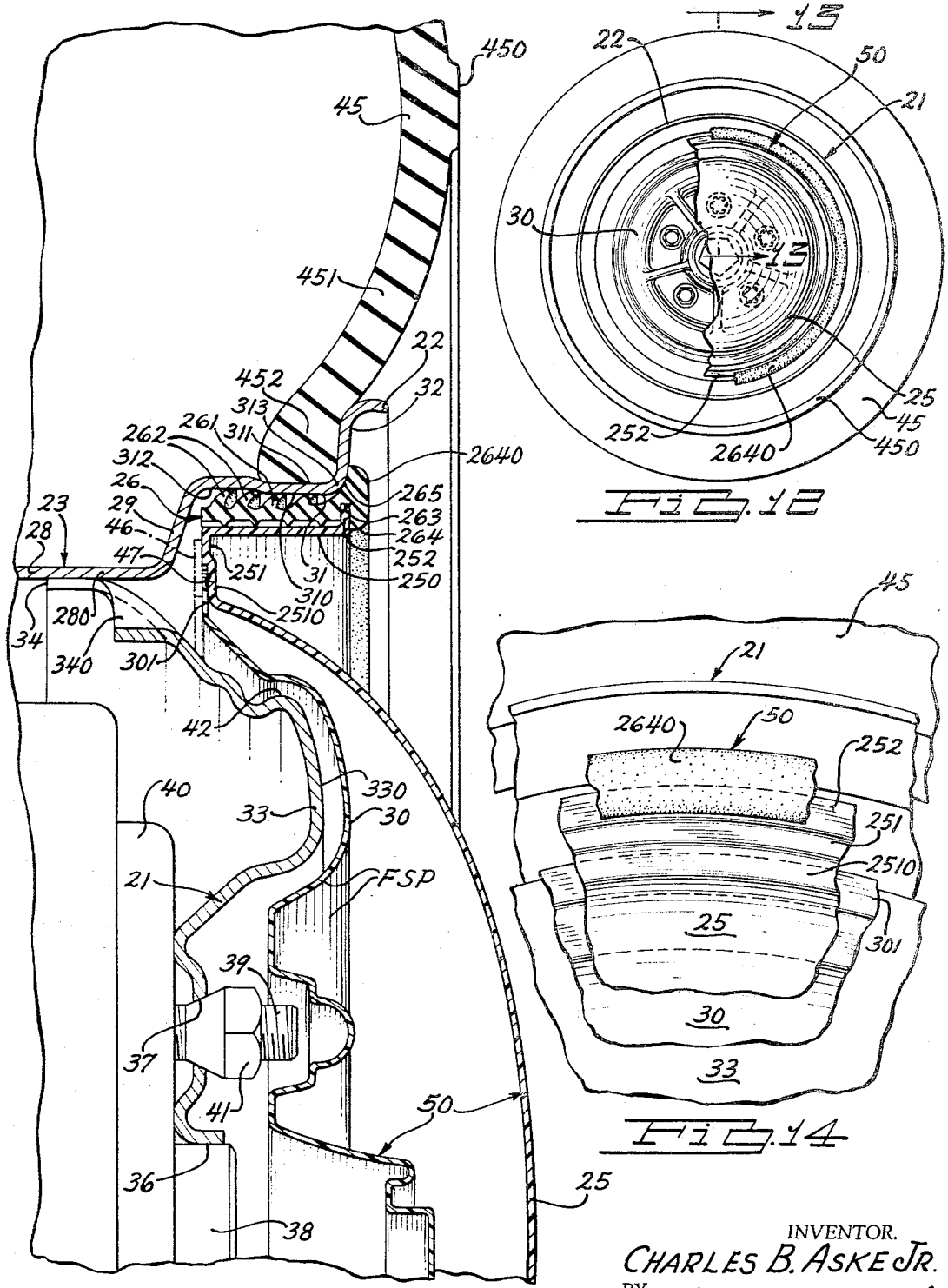

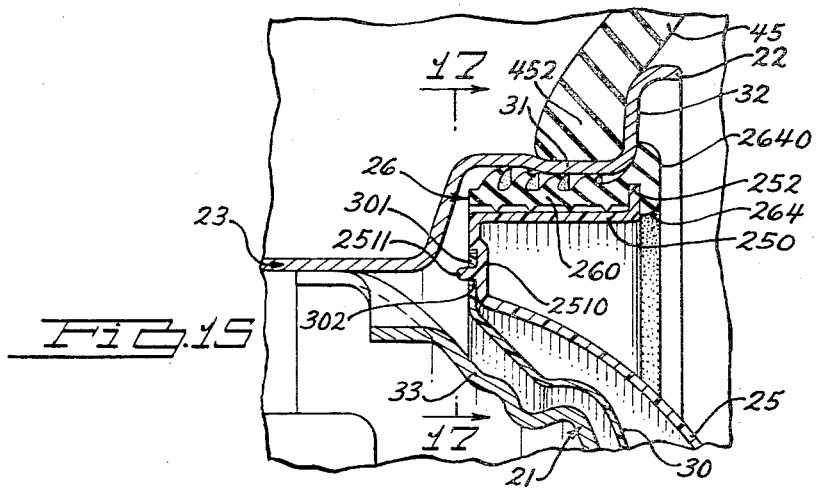
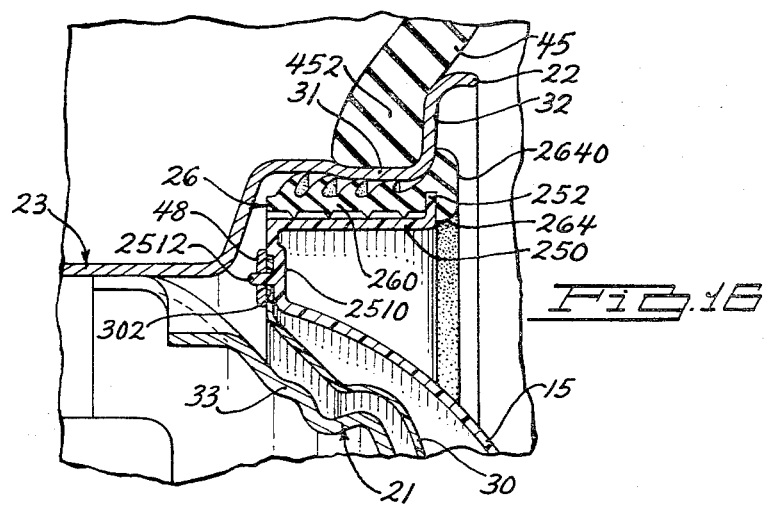
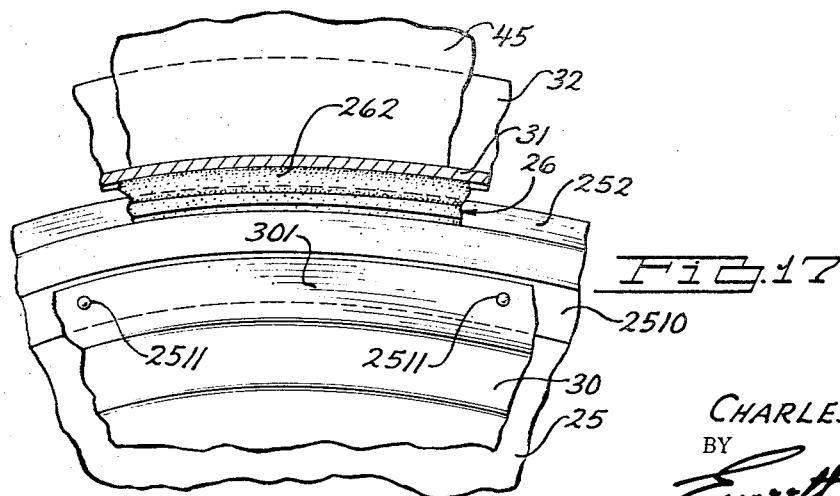

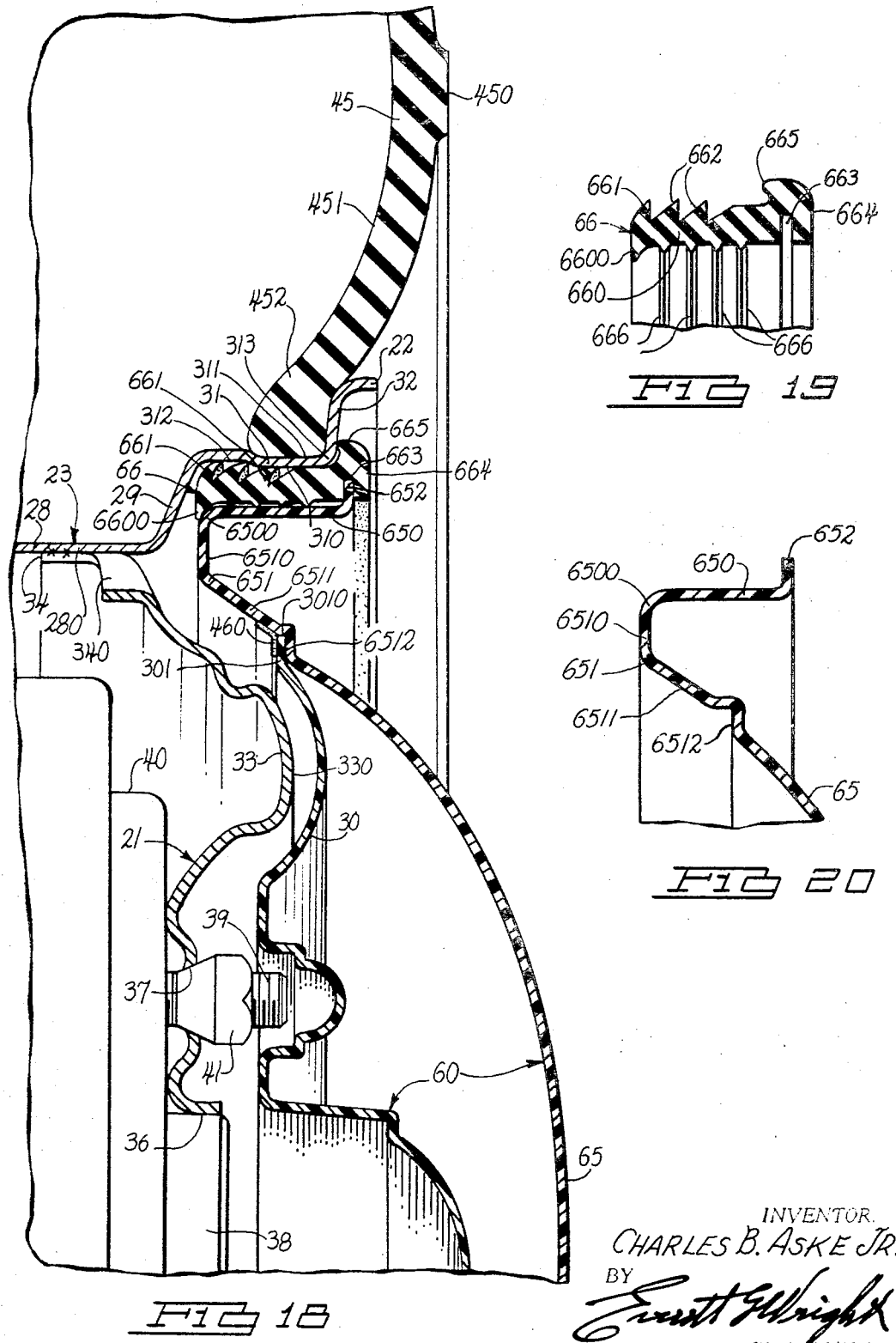

United States Patent Office 3,397,921
Patented Aug. 20, 1968

3,397,921
VEHICLE WHEEL TRIM
Charles B. Aske, Jr., Birmingham, Mich., assignor, by direct and mesne assignments, to Gar Wood Industries, Inc., a corporation of Michigan
Continuation-in-part of application Ser. No. 590,740, Oct. 31, 1966. This application Feb. 6, 1968, Ser. No. 709,160
24 Claims. (Cl. 301—37)

ABSTRACT OF THE DISCLOSURE

A vehicle wheel trim assembly preferably consisting of a transparent plastic generally dome shaped wheel cover element either clear or of a selected color usable with or without an inner patterned or otherwise ornamented disc preferably of opaque or deeply colored or plated plastic of relatively high reflective qualities, said domed shaped wheel cover element including a peripheral connector flange terminating in an axially outwardly disposed circumferential retainer flange, an annular resilient retainer ring telescopingly assembled on said retainer flange preferably including a plurality of generally radially disposed axially spaced circumferential resilient anchorage teeth on the outer periphery thereof formed to flex axially outwardly when said wheel cover and retainer ring assembly is mounted as on a modern vehicle wheel within the tire bead seat annulus thereof, an axially inwardly facing annular seat formed in said connector flange of said wheel cover element, said inner patterned ornamental reflective disc having a peripheral flange disposed on said annular seat of said connector flange, said reflective disc being formed otherwise for disposition in spaced relationship with respect to said domed shaped wheel cover element and said vehicle wheel, and means either removably or fixedly retaining said inner patterned ornamental wheel trim disc at its outer peripheral flange on said annular seat formed in said connector flange. Said plastic vehicle wheel trim assembly further including means compensating for differentials in expansion and contraction of the plastic of which the vehicle wheel trim assembly is formed and the metal vehicle wheel upon which the said plastic vehicle wheel trim is mounted.

This application is a continuation-in-part of application Ser. No. 590,740 filed Oct. 31, 1966, now abandoned, entitled Vehicle Wheel Trim.

This invention relates to improved vehicle wheel trim construction consisting of a preferably transparent plastic generally dome shaped wheel cover element either clear or preferably of a selected color usable with or without a selected inner patterned ornamental disc preferably of opaque or deeply colored or plated plastic having relatively high reflective qualities.

The broad object of the invention is to provide a generally dome shaped wheel cover element which is preferably formed with a generally radially outwardly disposed connector flange which terminates in an axially outwardly extending integral anchorage flange formed to accommodate and positively retain on the outer periphery thereof a resilient anchorage means for removably securing the said wheel cover element to a modern vehicle wheel concentrically with respect thereto within the tire bead seat annulus of the vehicle wheel rim in a manner to withstand road shocks and other forces tending to loosen the same from the vehicle wheel when the vehicle is in use, and, at the same time, allow and compensate for the differentials in thermal expansion and contraction between the plastic vehicle wheel trim and the metal vehicle wheel upon which the wheel trim is mounted. The said preferably dome shaped wheel cover element is preferably provided in the region of its connector flange with a suitable axially inwardly disposed annular seat to receive and hold in mating concentric relationship the outer peripheral flange of an inner patterned ornamental disc of relatively high reflectance qualities, if and when such an ornamental disc is employed therewith, the said patterned ornamental disc being axially spaced from said preferably dome shaped wheel cover element except at the outer periphery thereof which abuts the said annular seat preferably provided in the said connector flange of said wheel cover element.

Another object of the invention is to provide positive functioning means for preventing centrifugal and axial movement of the plastic vehicle wheel trim with respect to the resilient means employed for removably securing the vehicle wheel trim on said vehicle wheel.

Another object of the invention is to provide means for limiting the expansion of the plastic wheel cover element at the axial inner portion of the axially outwardly extending anchorage flange thereof which further functions to maintain radial pressure on the resilient securing means during periods of thermal contraction of said plastic vehicle wheel cover element.

Another object of the invention is to provide a vehicle wheel trim employing, in combination with a wheel cover element of the domed type herein disclosed, including a domed portion, a connector flange and an anchorage flange having a resilient anchorage means around the periphery thereof, an inner patterned ornamental disc element of plastic or other suitable material of a selected ornamental design and of the desired reflective qualities either permanently secured or removably secured in sealed or substantially sealed relationship concentrically to the rear portion of the plastic wheel cover element at an annular area or seat preferably formed in said connector flange between the domed portion and the anchorage flange thereof.

A further object of the invention is to provide in the dome shaped wheel cover element retainer means for removably securing the said inner patterned high reflectance ornamental disc element in assembled relationship within the said dome shaped wheel cover element whereby to admit of rapid assembly and disassembly of said elements at the point of sale to permit customers to select wheel trim of their choice from available designs and colors.

Other objects of the invention will become apparent by reference to the following detailed description taken in connection with the accompanying drawings, in which:

FIG. 1 is a side elevational view of a vehicle wheel having wheel trim in the form of a wheel cover of the invention mounted thereon.

FIG. 2 is an enlarged fragmentary sectional view taken on the line 2—2 of FIG. 1.

FIG. 3 is an enlarged fragmentary elevational view of the embodiment of vehicle wheel trim of the invention shown in FIGS. 1 and 2, parts being successively broken away.

FIG. 4 is an enlarged cross sectional view of one form of the annular resilient anchorage means preferably employed in the embodiment of the invention disclosed in FIG. 2 shown prior to assembling the same on the annular axially disposed anchorage flange of the wheel cover element.

FIG. 5 is an enlarged fragmentary view taken on the line 5—5 of FIG. 1 showing a preferred anchorage relationship between the axially disposed flange of the wheel cover element and the inner circumferential base of the resilient anchorage means.

FIG. 6 is an enlarged sectional view of the outer peripheral portion of the wheel cover element which may be employed in the embodiment of the invention shown in FIGS. 1–6 inclusive.

FIG. 7 is an enlarged fragmentary sectional view similar to FIG. 2 showing the employment of means limiting the expansion of the plastic wheel cover element at the inner axial portion of the peripheral flange thereof which also maintains radial pressure on the annular resilient securing means during thermal contraction of the wheel cover element.

FIG. 8 is an enlarged cross sectional view of another form of the annular resilient anchorage means employed in the embodiment of the invention disclosed in FIG. 7 prior to assembling the same on the axially disposed flange of the wheel cover element.

FIG. 9 is an enlarged fragmentary view taken on the line 9—9 of FIG. 8.

FIG. 10 is an enlarged sectional view of the outer peripheral portion of the wheel cover element disclosed in FIG. 7 showing the recess preferably provided for the means employed to limit expansion of the plastic wheel cover element and to maintain radial pressure on the annular resilient securing means during a greater contaction of the wheel cover element than the vehicle wheel.

FIG. 11 is a greatly enlarged sectional view taken substantially on the line 11—11 of FIG. 7.

FIG. 12 is a side elevational view of another embodiment of the vehicle wheel trim similar to that disclosed in FIG. 1 employing in combination with a vehicle wheel cover of the invention an inner patterned reflective ornamental disc type element.

FIG. 13 is an enlarged fragmentary sectional view taken on the line 13—13 of FIG. 12.

FIG. 14 is an enlarged fragmentary elevational view of the embodiment of vehicle wheel trim of the invention shown in FIGS. 12 and 13, parts being successviely broken away.

FIG. 15 is an enlarged fragmentary view similar to a portion of FIG. 13 showing pin means for removably securing the inner reflective ornamental element to said outer wheel cover.

FIG. 16 is an enlarged fragmentary view similar to FIG. 15 showing a combined pin and friction washer means for removably securing said inner reflective ornamental element to said outer wheel cover.

FIG. 17 is a fragmentary elevational view taken on the line 17—17 of FIG. 15 indicating circumferential spacing of the pin securing means shown in FIG. 15; the spacing of the pin and friction washer securing means of FIG. 16, if employed, being similar, FIG. 18 is a fragmentary sectional view similar to FIG. 13 showing a further modified form of the invention.

FIG. 19 is a cross sectional view of an alternate form of an annular resilient anchorage means preferably usable with the embodiment of the invention disclosed in FIG. 18.

FIG. 20 is a cross sectional view showing the outer peripheral portion of the embodiment of the wheel cover element disclosed in FIG. 18.

Referring now to the drawings wherein like reference characters refer to like and corresponding parts throughout the several views, the particular vehicle wheel trim 20 of the invention shown in FIGS. 1–6 inclusive generally consists of a bubble or dome shaped preferably transparent plastic wheel cover element 25 of a selected design and color formed with a generally dome shaped central portion having an integral annular generally radially outwardly disposed connector flange 251 terminating in an axially outwardly extending anchorage flange 250 over which a resilient anchorage means 26 is securely positioned. The said wheel cover element 25 and its resilient anchorage means are assembled into vehicle wheel trim 20 of the invention, which wheel trim assembly is positively telescopingly secured as a unit on a vehicle wheel 21 within the tire bead seat annulus 310 of the tire bead seat 31 thereof, all as hereinafter described in detail.

The said vehicle wheel 21 is the current modern type having a drop center rim 23 composed of a central channel or drop center 28 having side walls 29 and a base 280. An annular tire bead seat 31 extends laterally outwardly from each of the side walls 29 of the drop center 28, each said tire bead seat 31 preferably having an annular radially outwardly facing tire bead seat pocket 311 formed therein adjacent a tire bead seat flange 32 extending radially outwardly therefrom, the said tire bead seat flange 32 being axially outwardly curved at its upper portion to form an axially disposed outer lip 22. The said tire bead seat flange 32 is ofttimes referred to as the wheel flange, the said lip 22 is ofttimes referred to as the lip of the wheel rim, and the radially inner exposed annular face of the tire bead seat 31 is generally referred to as the tire bead seat annulus 310. The formation of the said tire bead seat pocket 311 in the tire bead seat annulus 310 provides an annular radially inwardly facing tire bead seat anchorage recess 312 which readily is employed to receive at least one of the preferably two axially inner anchorage teeth 262 of the resilient anchorage means 26 of the wheel trim anchor portion 260 of the resilient wheel trim securing means 26.

Within the drop center 28 of the drop center rim 23 is a wheel spider 33 having an axially disposed flange 34 which is secured to the base 280 of the drop center 28 of the drop center rim 23 by such means as welding at 35. The said wheel spider 33 is generally provided with a central hub aperture 36 with securing stud holes 37 spaced therearound to accommodate respectively the wheel hub 38 and wheel securing studs 39 extending from the brake drum 40 to which the wheel 21 is secured by means of the usual wheel securing nuts 41.

The flange 34 of the spider 33 is generally scalloped out and formed at 340 at intervals around the periphery thereof to provide brake drum ventilation and added structural strength to the vehicle wheel 21. The spider 33 is generally formed with an annular axially outwardly extending collar 330 which is preferably provided with a plurality of hub cap retainer nubs 42 over which a conventional hub cap (not shown) may be sprung for securement onto the vehicle wheel 21. However, in the instant invention, the hub cap need not be employed, since the wheel spider may be suitably painted and/or provided with chrome finished wheel securing nuts. Also, other attractive preferably relatively high reflectance ornamentation may be used on the wheel spider spaced from the wheel cover element 25. However, if the vehicle wheel 21 is provided with an ornamental hub cap (not shown) of relatively high reflective qualities, such may be used with a suitably transparent wheel cover element 25 of a selected color spaced thereover thereby providing a highly desirable aesthetic effect with third dimension qualities.

The particular tire 45 illustrated in the drawings is a tubeless tire having a scuff bead 450 extending from its side wall 451. The tire side wall 451 terminates in a suitable mounting bead 452 which seats in the said annular tire bead seat pocket 311 formed in the tire bead seat 31 of the wheel rim 23.

Referring now particularly to FIGS. 1–6 inclusive, the vehicle wheel trim 20 of the invention comprises a generally dome shaped wheel cover element 25 of a molded or otherwise formed transparent plastic material of a selected color or tint terminating at its outer periphery in a radially outwardly disposed annular connector flange 251 from the outer periphery of which extends an axially outwardly disposed annular anchorage flange 250 terminating at its outer periphery in a radially disposed circumferential retainer flange 252.

A resilient preferably live rubber retainer ring type anchorage means 26 having an annular axially disposed anchorage portion 260 is telescopingly assembled on the said anchorage flange 250 of the wheel cover element 25 and includes a plurality of generally radially disposed axially spaced circumferential teeth 261 and 262 formed to flex axially outwardly when the said wheel cover-retainer ring assembly forming the vehicle wheel trim 20 is mounted on the said vehicle wheel 21 within the tire bead seat annulus 310 thereof. It will be noted that at least one and preferably two of the axially spaced resilient teeth of the anchorage ring 26 are preferably longer as at 262 than the remaining normal length teeth as at 261, the axially innermost annular teeth 262 being the longer whereby to extend into the tire bead seat anchorage recess 312 of the annular tire bead seat 31 of the drop center wheel rim 23. This provides an improved and positive anchorage of the vehicle wheel trim 20 on the vehicle wheel 21. To remove the vehicle wheel trim 20 from the vehicle wheel 21, it is pried axially outwardly at short intervals around the periphery thereof progressively, placing a screw driver or other pry between the tire bead seat flange 32 of the drop center wheel rim 23 and the anchorage ring 26, and prying the vehicle wheel trim 20 axially outwardly using the juncture 313 of the annular tire bead seat 31 and the tire bead seat flange 32 as a fulcrum. This prying reverses the disposition of the anchorage teeth 261 and 262 whereupon the vehicle wheel trim 20 then may be removed relatively easily from the vehicle wheel 21.

By employing the foregoing construction, it has been possible to use plastic wheel covers 20 regardless of their relatively greater coefficient of expansion as compared to that of the steel vehicle wheel upon which such wheel covers are mounted. Extremes in cold and hot temperatures pose considerable problems in maintaining plastic wheel covers on a vehicle wheel. The use of somewhat longer continuous circumferential teeth 262, at least one of which drops substantially fully into the tire bead seat anchorage recess 312 of the tire bead seat 31 coupled with the use of relatively live rubber in the resilient anchorage means 26 assures a positive anchorage of the vehicle wheel 20 at all times, including in extremely cold weather.

Under various circumstances of temperature change, and also in the presence of moisture, there is a likelihood of the wheel cover element 25 ratcheting in respect to the anchorage means 26, or there would be a possibility of the wheel cover element 25 sliding axially outwardly from its normal position on the vehicle wheel 21 within the annulus of the resilient anchorage means 26. This is particularly true when one size vehicle wheel trim 20 is mounted on the same nominal size wheel produced by different manufacturers. However, the aforesaid possibilities are prevented in most instances by the interlocking anchorage of the resilient anchorage means 26 and the wheel cover element 25 by the positioning of the axially outer radially disposed circumferential retainer flange 252 of the wheel cover element 25 into the radially inwardly facing circumferential groove 263 provided therefor in the inner annulus of the said resilient anchorage means 26 adjacent the annular axially outer radially disposed flange 264 thereof.

The said annular axially outer radially disposed flange 264 of the resilient anchorage means 26 is formed at 265 to bear against the juncture 313 of the annular tire bead seat 31 and the tire bead seat flange 32 as best shown in FIG. 2. The said annular outer flange 264 of the resilient anchorage means 26 also serves to provide an annular ornamental band 2640 at the outer periphery of the vehicle wheel trim 20. For example, by forming the said resilient anchorage means 26 of white resilient rubber, the ornamental band 2640 would be white. Obviously, other colors could be used to provide an ornamental band 2640 of any other selected color.

By reference to FIG. 4 it will be observed that the lower portion of the said axially outer radially disposed flange 264 of the resilient anchorage means or ring 26 is extruded or molded on a substantial axially and radially inward disposition so that, when the said resilient anchorage means 26 is assembled on the wheel cover element 25, and the vehicle wheel trim 20 is mounted on a vehicle wheel as shown in FIG. 1, the said annular axially outer radially disposed flange 264 of the resilient anchorage means 26 bears firmly both at its top at 265 against the juncture 313 of the annular tire bead seat 31 and the tire bead seat 32 of the rim 23 of the vehicle wheel 21 and at its bottom against the axially outer radially disposed circumferential retainer flange 252 of the anchorage flange 250 of the wheel cover element as shown in FIG. 2.

Additional interlocking of the resilient anchorage means 26 and the wheel cover element 25 may be provided, if desired, to more positively prevent circumferential ratcheting and/or axial slippage of the wheel cover element 25 with respect to the said resilient annular anchorage means 26 and to further assure firm removable mounting of the vehicle wheel trim 20 on a vehicle wheel 21 within the tire bead seat annulus 310 of the drop center rim 23 thereof. This additional interlocking means preferably comprises the providing on the inner annulus of the resilient annular anchorage means 26 a plurality of axially spaced circumferential preferably inverted V-shaped ribs 266, and by providing on the outer periphery of the annular axially outwardly extending anchorage flange 250 of the wheel cover element 25 a plurality of circumferentially spaced axially disposed inverted V-shaped ribs 253. The said ribs 266 in the annular anchorage element 26 are best shown in FIG. 4, and the said ribs 253 of the wheel cover element are best shown in FIGS. 5 and 6, while their interlocked relationship is best shown in FIGS. 1, 5 and 11 wherein the hard ribs 253 of the wheel cover element 25 embed themselves into the relatively softer ribs 266 of the resilient anchorage means 26 and thereby positively prevent relative axial and circumferential movement therebetween when vehicle wheel trim of the invention is mounted on a vehicle wheel. The hard ribs 253 of the wheel cover element 25 will aid in preventing ratcheting of the wheel cover element 25, and the somewhat softer ribs 266 of the resilient anchorage means 26 will aid in preventing axial slippage of the wheel cover element 25 with respect to the resilient anchorage means 26. Obviously, both the ribs 253 and 266 may be employed, or, either the ribs 253 or the ribs 266 may be employed as desired or as required.

FIGS. 7-11 inclusive disclose an alternate embodiment of the vehicle wheel trim 20 which is designated by the reference numeral 20-A. In the alternate embodiment of the invention 20-A, there are two major differences in construction over the vehicle wheel trim 20; namely, the wheel cover element 25-A has the circumferentially outer axially inner portion of the annular axially outwardly extending anchorage flange 250 thereof recessed at 2500 to telescopingly accommodate an annular metal expansion limiting band 254, see FIGS. 7 and 10, and the providing of an axially inner annular axially inwardly disposed annular bead 267 on the resilient anchorage means 26 to overlie the inner annulus of the said expansion limiting band 254 maintaining it in position during excessive contraction of the wheel cover element 25 with respect to that of the vehicle wheel 21 as could occur in extremely cold weather. While the alternate construction disclosed in FIGS. 7-11 inclusive may be used, the requirement therefor would depend upon the particular expansion and construction characteristics of the plastic out of which the wheel covers are molded, and also upon the dimensional uniformity and manufacturing tolerances maintained in the production of vehicle wheels and/or vehicle wheel trim.

Referring now to the embodiment of wheel trim 50 of the invention disclosed in FIGS. 12-14 inclusive, it is like and similar to the wheel trim 20 of the invention disclosed in FIGS. 1-6 inclusive except that the connector flange 251 of the wheel cover element 25 is suitably offset providing an annular seat at 2510 to accommodate and receive the outer annular peripheral flange 301 of an inner reflective patterned ornamental wheel disc 30. The said inner patterned reflective wheel disc 30 is preferably formed of a relatively thin highly reflective plastic material and may be of any aesthetic design or form; for example, it may simulate wire wheels or artillery wheels, or be of a design carrying a simulated wheel having relatively large multi-sided cap nuts, or other appropriate aesthetic designs, preferably which provide a shimmering reflective quality as the vehicle wheel rotates. Further, as an example, but not limiting the inner wheel disc 30 is preferably either of a relatively dense reflective color or it may be first surface (axially outer surface) plated at FSP either chrome, gold, copper or any other color, which, when viewed through the transparent preferably lightly colored wheel cover element 25 produces a remarkable glowing reflection. When a chrome first surface plated FSP inner wheel disc 30 is employed within an outer transparent red wheel cover element 25, the vehicle wheel trim glows and reflects a red warning signal under the influence of relatively bright light directed thereon whereby to provide a safety warning signal when a vehicle equipped with such vehicle wheel trim enters an area covered by bright light from bright daylight or from the headlights of other vehicles at night.

In addition to the novel aesthetic effect obtained by the combination with a transparent colored wheel cover element 25 and an inner reflective patterned ornamental wheel disc 30, the first surface plating FSP of the ornamental wheel disc 30 is thoroughly protected from road dirt, slush, mud, and rain water, as well as vehicle wash rack scrubbing. The said ornamental wheel disc 30 may be secured to the wheel cover element 25 at the offset or annular seat 2510 of the connector flange 251 thereof by such means as an adhesive tape 46 or a suitable plastic adhesive 47 indicated by the character X in FIG. 13.

It is, of course, contemplated that the inner ornamental wheel disc-outer wheel cover construction of the wheel trim 50 of the invention shown in FIGS. 12–14 inclusive may employ in connection therewith the features disclosed in FIGS. 1–11 inclusive and in FIGS. 15–17 inclusive, and further that the embodiment of the invention disclosed in FIGS. 18–20 inclusive may employ in connection therewith features disclosed in the other embodiments of the invention.

Referring now particularly to FIGS. 15–17 inclusive, means for removably securing the inner reflective wheel disc 30 to the wheel cover element 25 at the offset 2510 therein may comprise a friction pin connection as shown in FIG. 15 or a combination friction pin and lock washer connection as shown in FIG. 16. A multiple of such connections may be employed around the outer flange 301 of the ornamental wheel disc 30 when it engages spaced pins extending axially from the offset portion 2510 of the wheel cover element 25.

In FIG. 15 is shown a pin 2511 molded in the offset 2510 of the wheel cover element 25 which are spaced around the axially inner face of the said offset 2510. Suitable apertures 302 are provided in the outer flange 301 of the inner preferably patterned ornamental reflective wheel disc 30 sized and/or to admit of frictionally impaling the said ornamental reflective wheel disc in its proper position on the wheel cover element 25. The means for removably securing the reflective wheel disc 30 to the wheel cover element 25 disclosed in FIG. 16 is like and similar to that shown in FIG. 15 except the pin 2512 in FIG. 16 is somewhat longer than the pin 2511 in FIG. 15 to accommodate a suitable friction lock washer 48. Obviously, other means may be employed for removably securing the outer peripheral flange 801 of the said inner preferably patterned ornamental reflective wheel disc 30 to the wheel cover element 25 at the annular offset portion or seat 2510 preferably formed in the connector flange 251 of the said wheel cover element 25. It will be noted that, except at the outer annular peripheral flange 301 of the said patterned ornamental reflective wheel disc 30, the said patterned ornamental reflective wheel disc 30 is axially spaced within the preferably transparent plastic wheel cover element 25 of a selected design and color.

Referring now to the embodiment of the invention disclosed in FIGS. 18–20 inclusive, the vehicle wheel trim 60 is like and similar to the vehicle wheel trim 50 shown in FIGS. 13, 14 and 15, one major exception being that the generally radially disposed connector flange 651 extending integrally between the outer periphery of the dome shaped portion of the wheel cover element 65 and the anchorage flange 650 thereof has a radially disposed outer portion 6510, a diagonally disposed annular central portion 6511, and an annularly axially disposed offset portion providing an annular axially facing inner seat 6512 located adjacent the said dome shaped portion of the wheel cover element 65. The outer annular peripheral flange 301 of the inner preferably patterned ornamental relatively highly reflective wheel disc 30 seats on the annular seat 6512 of the said connector flange 651, and is removably secured thereto by such means as an adhesive tape 460 or any other suitable securing means.

The said adhesive tape securement 460, if employed, need not be continuous around the joint 3010 between the diagonally disposed annular central portion 6511 of the connector flange 651 and the outer peripheral flange 301 of the said inner preferably patterned ornamental relatively highly reflective wheel disc 30 inasmuch as it has been found that several short lengths of the said adhesive tape 460 positioned at substantially even intervals along and over the said joint 3010 will suffice. This admits of ready interchangeability of one design or style of patterned ornamental reflective wheel disc 30 for another at the point of sale, if such be desired.

The resilient anchorage means 66 of the embodiment of the invention 60 disclosed in FIGS. 18–20 inclusive is like and similar to the resilient anchorage means 26 shown in FIGS. 13, 14 and 15 except that only three generally radially disposed circumferential anchorage teeth 661 and 662 are employed on the annular axially disposed anchorage portion 660 thereof in place of the four anchorage teeth shown in FIG. 13, at least one and preferably two of the axially innermost of the anchorage teeth 661 and 662 are disposed in the tire bead seat anchorage recess 312 of the annular tire bead seat 31 when the vehicle wheel trim 60 is mounted on the vehicle wheel 21 as shown in FIG. 18.

Also, in the embodiment of the invention 60, the annular axially disposed anchorage portion 660 of the resilient anchorage means 66 is provided with an integral axially and radially inner annular bearing element 6600 which fits neatly over the rounded corner 6500 at the annular juncture of the radially outer portion 6510 of the connector flange 651 and the anchorage flange 650 of the said vehicle wheel trim 60.

The said resilient anchorage means 66 is provided at its axially outer portion with an annular axially outer radially disposed flange 664 which is preferably formed with a radially inwardly facing circumferential groove 663 therein into which the axially outer radially disposed circumferential retainer flange 652 of the dome shaped wheel cover element 65 extends. Thus, the resilient anchorage means 66 is anchored at both the outer and inner annular portions thereof against axial movement with respect to the anchorage flange 650 of the dome shaped wheel cover element 65, and, at the same time, the axially inwardly disposed annular tooth 661 of the resilient anchorage means 66 is supported at the rounded corner 6500 at the annular juncture of the radially outer portion 6510 of the connector flange 651 and the anchorage flange 650 of the said wheel trim 60. This is important when vehicle wheel trim 60 of the invention is vacuum formed, as distinguished from being injection molded, inasmuch as vacuum forming requires the use of a substantial radius at the annular juncture at 6500 rather than a sharp or substantially ninety degree corner at 6500 which would be attainable if the vehicle wheel trim 60 were injection molded rather than vacuum formed.

It should be further noted with respect to the embodiment of the invention 60 disclosed in FIGS. 18–20 inclusive that the annular axially outer radially disposed flange 664 of the resilient anchorage means 66 is provided adjacent its outer periphery with an axially inwardly disposed annular contact bead 665 which is located to contact the axially outer tire bead seat flange 32 of the drop center wheel rim of the vehicle wheel 21 onto which the said vehicle wheel trim 60 of the invention may be mounted. This axially inwardly facing somewhat compressible annular bead 665 takes-up and compensates for instances wherein the wheel trim 60 is required to fit axially onto vehicle wheels of different tire bead seat axial depth as oftentimes are found where the same nominal size vehicle wheels are produced by different manufacturers. The said axially inwardly facing annular bead 665 assures contact between the said annular axially outer radially disposed flange 664 of the resilient anchorage means 66 whenever a person installing vehicle wheel trim of the invention on a vehicle wheel fails to press or drive the vehicle wheel trim axially to refusal on the wheel rim of a vehicle wheel 21 within the tire bead seat annulus 310 thereof.

Also, the inner annulus of the resilient anchorage means 66 may be provided with a plurality of suitably axially spaced preferably inverted V-shaped ribs 666 for any one or more of several conditions; namely, first, to compensate relatively small differences in the diameter of the tire bead seat annulus 310 of nominal sizes of vehicle wheels 21 as produced by different manufacturers, secondly, to compensate for relatively slight differences in the manufactured diameter of the anchorage flange 650 of the dome shaped wheel cover element 65, and thirdly, to compensate for differentials in expansion and contraction of the metal vehicle wheel 21 and the wheel cover 65. Obviously, the depth and detailed size or shape of the said V-shaped ribs 66 would depend upon the resiliency of the rubber out of which the said resilient anchorage means 66 is extruded or molded, and upon particular cumulative effect of such of the aforementioned conditions as may present themselves.

It is obvious that one or more of the novel features of the invention disclosed in connection with the embodiment of the invention disclosed in FIGS. 18–20 inclusive may be employed with the features of the embodiments of the invention as disclosed in FIGS. 1–17 inclusive and vice versa when and as required to meet the demands of the trade, interchangeability between vehicle wheels and vehicle wheel trim of the invention, and/or to meet or cope with other requirements.

I claim:

1. A vehicle wheel trim of the type securable to a vehicle wheel at the tire bead seat annulus of the wheel rim
   a generally dome shaped wheel cover element molded of a transparent plastic material of a selected color having a dome shaped central portion and a generally radially outwardly disposed connector flange,
   an axially disposed annular anchorage flange formed integral with an extending axially outwardly from the outer periphery of said connector flange,
   said anchorage flange terminating in a radially disposed circumferential retainer flange,
   and an annular resilient retainer ring telescopingly assembled on the anchorage flange of said wheel cover element including a plurality of radially disposed axially spaced resilient annular flexible teeth on the outer periphery of said retainer ring formed to flex axially outwardly when said wheel cover-retainer ring assembly is mounted on said vehicle wheel within the tire bead seat annulus thereof,
   the said resilient retainer ring including an axially outer bead thereon having a radially inner circumferential groove therein receiving the circumferential retainer flange of the anchorage flange of said wheel cover element whereby to maintain said resilient retainer ring in its assembled relationship on said anchorage flange of said wheel cover element.

2. A vehicle wheel trim as claimed in claim 1 wherein the axially outer bead of said resilient retainer ring is formed to bear upon the axially outwardly disposed portion of the tire bead seat of said vehicle wheel.

3. A vehicle wheel trim as claimed in claim 1 wherein the axially outer bead of said resilient retainer ring is formed with a small annular rib at its axially inwardly facing annular outer corner to contact the wheel rim of the vehicle wheel when said wheel cover-retainer ring assembly is axially telescopingly mounted on said vehicle wheel within the tire bead seat annulus thereof.

4. A vehicle wheel trim as claimed in claim 1 wherein the resilient retainer ring is formed of rubber of a color contrasting with the color of said wheel cover element.

5. A vehicle wheel trim as claimed in claim 1 wherein at least one of the axially innermost of the axially spaced resilient annular flexible teeth on the outer periphery of said retainer ring is longer than the others.

6. A vehicle wheel trim as claimed in claim 1 wherein the said resilient retainer ring includes an axially inner bead thereon extending over a portion of the outer periphery of the annular connector flange of said wheel cover element.

7. A vehicle wheel trim as claimed in claim 1 wherein the axial outer bead of said resilient retainer ring is formed with an integral annular radially and somewhat axially inwardly disposed flange.

8. A vehicle wheel trim as claimed in claim 1 wherein the inner annular portion of the resilient retainer ring is provided with a plurality of axially spaced circumferential ribs.

9. A vehicle wheel trim as claimed in claim 1 wherein the outer annular portion of the anchorage flange of the wheel cover element is provided with a plurality of circumferentially spaced axial ribs.

10. A vehicle wheel trim as claimed in claim 1 wherein the inner annular portion of the resilient retainer ring and the outer annular portion of the anchorage flange of the wheel cover element are provided respectively with axially spaced circumferential ribs and circumferentially spaced axial ribs,
    the said ribs of said anchorage flange deforming said resilient ribs of said resilient retainer ring providing interlocking of said resilient retainer ring and said anchorage flange with respect to each other when said resilient retainer ring is telescopingly assembled on said anchorage flange of the wheel cover element.

11. A vehicle wheel trim as claimed in claim 1 wherein the said anchorage flange is recessed adjacent the said annular connector flange, and
    an annular metal expansion limiting band is telescoped over the said anchorage flange at said recess therein.

12. A vehicle wheel trim as claimed in claim 1 wherein the said anchorage flange is recessed adjacent said annular connector flange,
    an annular metal expansion limiting band is telescoped over the said anchorage flange at said recess therein, and
    the said resilient retainer ring includes an axially inner circumferential bead extending at least over the axial inner edge of said metal expansion limiting band.

13. A vehicle wheel trim as claimed in claim 1 wherein an annular metal expansion limiting band is telescoped over the axially inner portion of said anchorage flange, and
    the said resilient retainer ring includes an axially inner circumferential bead extending over the axially inner edge of said anchorage flange.

14. A vehicle wheel trim as claimed in claim 1 wherein the said generally radially outwardly disposed connector flange of said wheel cover element is axially offset providing an annular seat therein, and the said vehicle wheel trim includes an inner patterned ornamental wheel disc having a radially disposed circumferential flange therearound, said inner patterned ornamental wheel disc being positioned in axially spaced relationship within said vehicle wheel cover element with only the circumferential flange thereof disposed in mating contact with the said annular seat formed in said wheel cover element, and means securing the circumferential flange of said inner patterned ornamental wheel disc in its mated position within the said annular seat formed in said connector flange of said wheel cover element.

15. A vehicle wheel trim as claimed in claim 14 wherein the said ornamental wheel disc to wheel cover element securing means is an adhesive.

16. A vehicle wheel trim as claimed in claim 14 wherein the said ornamental wheel disc to wheel cover securing means removably secures said inner patterned ornamental wheel disc in mated position within said annular seat formed in said connector flange of said wheel cover element and consists of adhesive tape means.

17. A vehicle wheel trim as claimed in claim 14 wherein said ornamental wheel disc to wheel cover element securing means comprises a plurality of circumferentially spaced anchorage pins formed in one of said circumferential flange of said ornamental wheel disc and said annular seat formed in said connector flange of said wheel cover element, the other of said connector flange of said wheel cover element and said circumferential flange of said ornamental wheel disc having suitable circumferentially spaced apertures therein disposed opposite said anchorage pins sized to telescope thereover and hold said ornamental wheel disc in assembled relationship within said vehicle wheel cover.

18. A vehicle wheel trim as claimed in claim 14 wherein said ornamental wheel disc to wheel cover securing means comprises a plurality of circumferentially spaced axially inwardly extending anchorage pins formed in said offset of the anchorage flange of said wheel cover, the connector flange of said ornamental wheel disc having circumferentially spaced apertures therein permitting said ornamental wheel disc to be telescoped over said anchorage pins thereby assembling said ornamental wheel disc within said wheel cover, and a friction washer securing means telescoped over the free ends of each of said anchorage pins after said assembly of said wheel disc within said wheel cover.

19. A vehicle wheel trim of the type securable to a vehicle wheel at the tire bead seat annulus of the wheel rim thereof comprising, in combination with a vehicle wheel having an annular anchorage recess formed in said tire bead seat annulus, a wheel cover element formed of plastic having a central domed portion terminating in a generally radially outwardly disposed annular connector flange, an axially disposed anchorage flange formed integral with and extending axially outwardly from the outer periphery of said connector flange, an annular resilient rubber-like retainer ring telescopingly assembled on said anchorage flange having integral teeth formed to resiliently engage said tire bead seat annulus when the said wheel trim is telescopingly mounted in said tire bead seat annulus, and spaced rib means on at least one of said resilient retainer ring and said anchorage flange engaging the other preventing movement of one of said retainer ring and anchorage flange with respect to the other when the plastic wheel cover element contracts with respect to the vehicle wheel rim at low temperatures.

20. A vehicle wheel trim as claimed in claim 19 wherein the said generally radially outwardly disposed connector flange of said wheel cover element is axially offset providing an annular seat therein, and the said vehicle wheel trim includes an inner patterned ornamental wheel disc having a radially disposed circumferential flange therearound, said inner patterned ornamental wheel disc being positioned in spaced relationship within said vehicle wheel cover except at its circumferential flange which is disposed in mating contact with the connector flange of said wheel cover at said annular seat therein and means removably securing the circumferential flange of said inner patterned ornamental wheel disc in its mated position within said annular seat in the connector flange of said wheel cover.

21. A vehicle wheel trim of the type securable to a vehicle wheel at the tire bead seat annulus of the wheel rim thereof comprising, in combination with a vehicle wheel having an annular anchorage recess formed in said tire bead seat annulus, a wheel cover element formed of a transparent plastic of a selected color having a dome shape central portion terminating in a generally radially outwardly disposed annular connector flange, an axially disposed anchorage flange formed integral with and extending axially outwardly from the outer periphery of said connector flange, said connector flange having an axially inwardly disposed annular seat formed in the inner periphery thereof in the region of said dome shaped wheel cover element, an inner patterned ornamental plastic wheel disc of relatively high reflective qualities of a second selected color having a circumferential flange disposed in mating contact with said annular seat formed in said connector flange, said patterned ornamental wheel disc being axially spaced from the dome shaped wheel cover element except where the circumferential flange thereof abuts the annular seat formed in the connector flange of said wheel cover element, means removably securing said inner patterned ornamental wheel disc to said dome shaped wheel cover element adjacent the said annular seat formed in the said connector flange thereof, and an annular resilient retainer ring telescopingly assembled on said anchorage flange formed to resiliently engage the tire bead seat annulus of said vehicle wheel rim when said wheel trim is telescopingly mounted on said vehicle wheel within the tire bead seat annulus thereof.

22. A vehicle wheel trim as claimed in claim 21 wherein the outer periphery of said annular resilient retainer ring is formed with suitable integral axially spaced circumferential toothed means formed to resiliently contact the axially disposed tire bead seat annulus of said vehicle wheel and removably secure said vehicle wheel trim thereon.

23. A vehicle wheel trim as claimed in claim 21 wherein the inner annulus of said annular resilient retainer ring is provided with a plurality of integral axially spaced circumferential teeth contacting the axially disposed anchorage flange of said wheel cover element.

24. A vehicle wheel trim as claimed in claim 21 wherein the outer periphery of said annular resilient retainer ring is formed with suitable integral axially spaced circumferential toothed means formed to resiliently contact the axially disposed tire bead seat annulus of said vehicle wheel and removably secure said vehicle wheel trim thereon, the inner annulus of said annular resilient retainer ring is provided with a plurality of integral axially spaced circumferential teeth contacting the axially disposed anchorage flange of said wheel cover element, said inner axially spaced circumferential teeth being of a selected size and shape to compress and expand readily to compensate for manufacturing tolerances in the size of the tire bead seat annulus of the vehicle wheel and in the diameter of the anchorage flange of the said wheel cover element, and to aid said resilient retainer ring in compensating for differentials of expansion and contraction of the metal vehicle wheel and the wheel cover element.

References Cited

UNITED STATES PATENTS

| | | | |
|---|---|---|---|
| 2,657,099 | 10/1953 | Judd | 301—37 |
| 2,812,215 | 11/1957 | Waite | 301—37 |
| 2,963,325 | 12/1960 | Aske | 301—37 |
| 3,265,441 | 8/1966 | Baldwin | 301—37 |

RICHARD J. JOHNSON, *Primary Examiner.*